Aug. 7, 1951  G. VON BEKESY  2,563,384
APPARATUS FOR DRAWING PSYCHOLOGICAL-PHYSIOLOGICAL
CURVES (AUDIOMETER, ETC.)
Filed Feb. 9, 1948  3 Sheets-Sheet 1

INVENTOR
GEORG von BÉKÉSY
BY
ATTORNEYS Leech + Radue

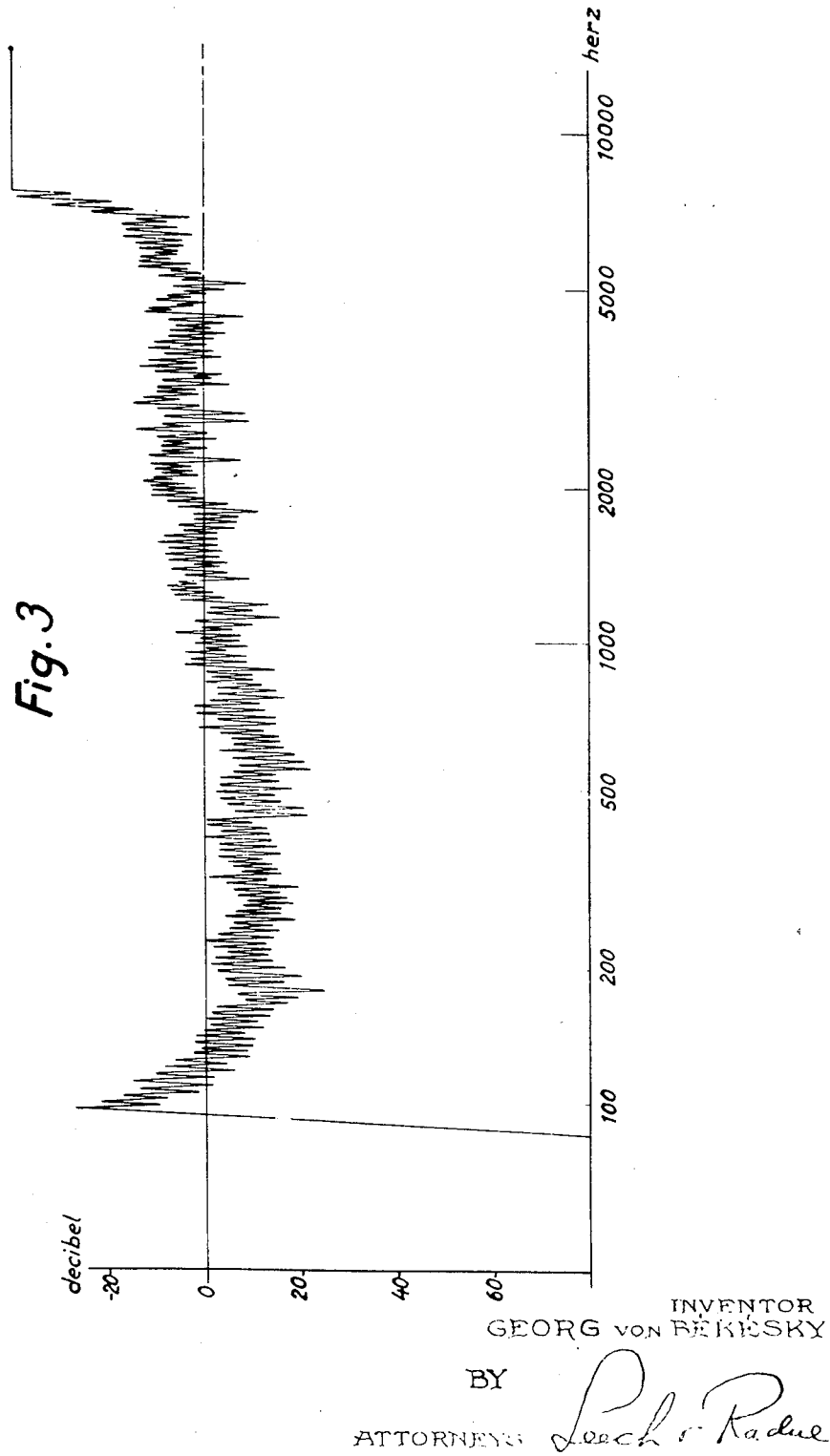

Patented Aug. 7, 1951

2,563,384

UNITED STATES PATENT OFFICE 2,563,384

APPARATUS FOR DRAWING PSYCHOLOGICAL-PHYSIOLOGICAL CURVES (AUDIOMETER, ETC.)

Georg von Békésy, Cambridge, Mass.

Application February 9, 1948, Serial No. 7,085
In Sweden February 11, 1947

5 Claims. (Cl. 346—33)

This invention relates to a method of and apparatus for recording graphically the relation between a frequency of a physical quantity, variable with time in a given manner, and the intensity of this quantity at the point of time indicated by an object affected by said intensity, by the actuation, respectively, in opposite directions of a control element. This object may be defined as such that when a frequency of a physical quantity of given intensity and variable with time in a given manner is applied to it, it will operate to actuate a control element in one direction for certain combinations of frequency and intensity while it will actuate the control element in an opposite direction for certain other combinations.

The invention has for its purpose to enable problems analogous to the following to be dealt with:

In a number of medical or psycho-technical problems information is desirable for determining the relation between a sensation and a variable physical quantity. It may be desired, for example, to determine the relation between the minimum light intensity perceptible to the eye and the wave length of the light, with different subjects. A measurement of this kind is carried out by producing a light with a certain wave length and continually increasing the intensity of the light, in a completely darkened room, until the subject receives a sensation of light. The light intensity which is barely perceptible is then recorded. Light having another wave length is then produced and the measurements are repeated until it is possible after taking a series of such measurements to obtain a curve over the entire frequency range of the light waves.

If the problem is restricted primarily to hearing as a sensation, then it is clear that the sound intensity impression of a tone must be determined in relation to the frequency of that tone. In order to investigate hearing in this manner it is usual to determine the sound intensity of the limit of audibility of a tone in relation to its frequency. This is usually done by means of a so-called audiometer and the separate measured points for the different frequencies are drawn on an audiogram.

An important feature of the invention relates to the development of a system and the construction of devices by means of which the recording of the relation between the said quantities is appreciably facilitated and the possibility of errors is reduced. According to a special form of construction of the invention the recording of the said graphic relation is effected automatically whereby the investigations are further simplified since it is not necessary in this case to provide an observer for each subject.

The invention may be applied in one of its embodiments with advantage to so-called audiometers, since in every aural clinic a curve for the limit of audibility is plotted for each patient, which has hitherto occupied a time of about one hour without its being possible to draw the necessary conclusions in a satisfactory manner for the measurements obtained.

The invention will now be particularly described with reference to the accompanying figures.

Fig. 3 is an audiogram obtained by the use of the apparatus of Fig. 1.

Figure 1:
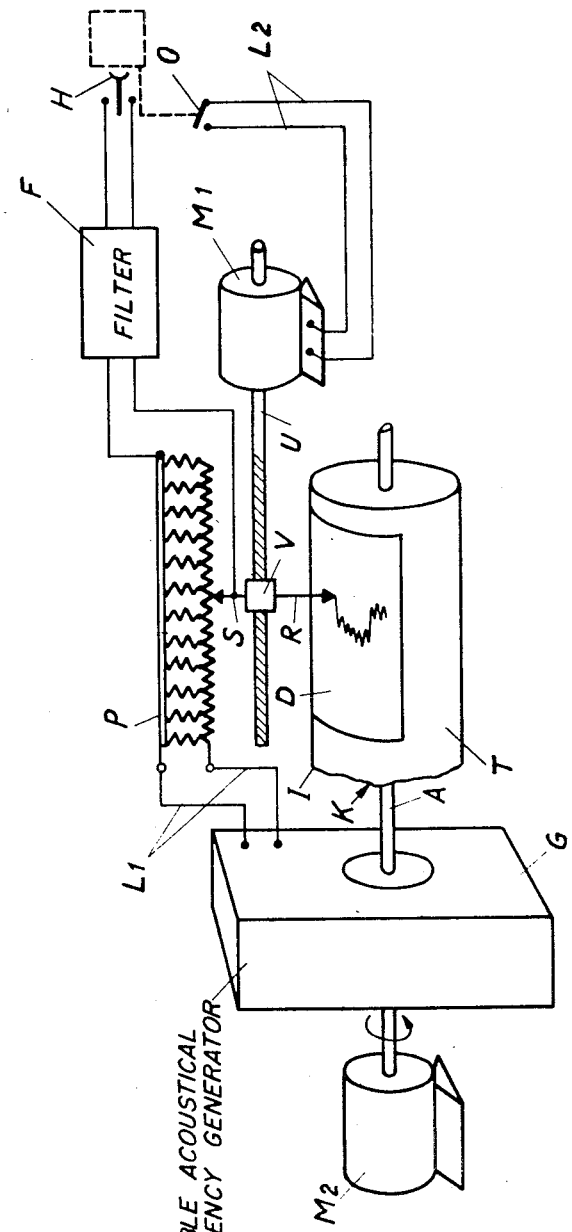
Fig. 1 is a schematic and wholly diagrammatic view of apparatus of a type for carrying out the system of the present invention and arranged for preparing audiograms.

In Fig. 1 a variable frequency generator G of a physical quantity has its output associated with an intensity reducing device P. The output from P passes through the filter F, which is dependent on the frequency of the physical quantity. Through a suitable transducer H the output of the filter is applied to the object X, which as previously mentioned is in control of switch O for actuating the reversible motor sevo system MI, which drives a threaded spindle U on which is fitted a nut V driving a regulating member S cooperating with the intensity reducing device P to regulate the operation of the same. Nut V also drives a pen R bearing on diagram paper D, which is mounted on a supporting member T driven by motor M2 through shaft A which also exerts a control on the frequency generated by G.

In operation the physical quantity generated in G acts on the object so that the latter actuates the switching device or control means O at a given combination of intensity and frequency. This changes the direction of rotation of motor MI, as will be later described, and hence the position of V to displace the regulating member S and the pen R. By means of this continuous displacement of the regulating member S the physical quantity transmitted through the reducing device P by the variable frequency generator G will be caused to vary in intensity continuously or in a given series of steps according to the construction of the reducing device. The object X maintains the previous control position until another given combination of frequency and intensity of the quantity applied to it is reached, at which time the control O is reversed. This reverses the direction of rotation of the motor M and of the attached parts S and R, and varies the direction of regulation of the physical quantity in the reducing device P. The object X maintains this position of the control element until the physical quantity which varies in intensity has again reached the first given combination of frequency and intensity, when the control is again reversed.

During the above, the intensity of the physical quantity is recorded on chart D, which is slowly moved in a direction at right angles to the movement of pen R, under the action of motor M2, which acts on shaft A to cause a displacement of the supporting member T uniformly with time. The movement of T may be rotary, whereby the supporting member represents a drum or the like. The recording on D represents the course of the intensity of the quantity transmitted to the object X and the constant movement of D by M2 at right angles to the movement of R produces a curve in which time is the abscissa and the intensity of the physical quantity is the ordinate. A diagram may thus be obtained as shown in Fig. 3.

The variable frequency generator is actuated by motor M2 so that continuous variation in the frequency of the physical quantity will result. Preferably the arrangement is such that displacement of the supporting member T provides that each point of time corresponds to a given frequency adjustment of generator G. If this frequency relation is set down as a scale on the diagram paper, as shown in Fig. 3, the abscissa will represent a given frequency scale.

The variable frequency generator can be constructed to provide a constant intensity of the physical quantity for a given ordinate scale over the entire frequency scale, i. e. so that the intensity at any fixed setting of the regualting member S over the whole displacement range provided by the motor M2 represents a constant value. In another form of construction the filter F, which is dependent on frequency, cooperates with mechanism for laterally translating carrier T comprising a guide edge I thereon of cam-like form moving over a fixed pin K. The cam shape is such that by its operation the lateral displacement of T compensates for intensity variation with frequency.

In Fig. 1 the invention is illustrated for general use and in a specific form for providing audiograms and in this case electrical connections from the variable electrical acoustical frequency generator F are shown as L1 to potentiometer P which varies the signal intensity delivered to filter F and telephone receiver H worn by the person, who is the equivalent of the object X in the first embodiment. The person controls the opening or closing of switch O operating through lines L2 to determine the direction of operation of servomotor mechanism M1. The record sheet D is arranged on a cylinder rotated from a motor M2. The shaft A passes through and controls the frequency of generator A in a similar manner as described in Fig. 1. In making an audiogram such as shown in Fig. 3, the operation is as follows:

When the subject depresses the press-button O the motor M1 will start up in such a direction of rotation that the sound intensity of the tone produced in the telephone receiver will be continuously amplified by the potentiometer P. The subject is instructed to keep the button pressed down as long as he cannot hear any sound. The motor thereby continues to rotate in the same direction until the subject can just hear a sound and has therefore reached the limit of audibility. At the moment he hears a sound he should release the press-button. The arrangement is such that when the press-button is released, the motor reverses its direction of rotation, whereupon the sliding contact of the potentiometer is moved in the opposite direction and the sound intensity will decrease. At the moment in which the sound is inaudible the subject again presses down the button O whereupon the motor will again reverse its direction of rotation and, through the displacement of the sliding contact S on the potentiometer, will amplify the current until the sound again becomes audible. Thus, by means of the motor M1 the direction of rotation of which is periodically reversed, the intensity of the sound will be varied between a barely audible value which is just below audibility. The position of the sliding contact S on the potentiometer is immediately recorded by the recording pen R on the paper attached to the drum T.

During the whole time the examination is in progress—15 minutes, for example—the frequency of the current supplied by the generator is varied by means of the motor M2, from 100 cycles at the beginning of the examination up to 2000 cycles at its conclusion. At the same time the drum rotates continuously, being driven by the shaft A which is driven in turn by the motor M2. On the diagram, see Fig. 3, the variations in the position of the sliding contact S are recorded by the recording pen R in the longitudinal direction of the drum T in which the intensity of the said sound is plotted, whereby the limit values for barely audible and just inaudible sounds are obtained. In a direction at right-angles to the longitudinal direction the different frequencies are plotted. The curve in Fig. 3 gives a clear picture of the subject's attempt to adjust the limits of audibility accurately. The potentiometer is calibrated in decibels, so that the curve produced on the diagram paper D directly represents an audiogram.

For a number of medical purposes it appears desirable to construct the device in such a way that the audiogram for a person with normal hearing will be a straight line, so that any deviations from the straight line will indicate defective hearing. For this purpose a suitable filter F is connected between the telephone receiver and the potentiometer which produces the desired frequency relation. Telephone receivers also frequently give rise to irregularities in sound emission. These can likewise be easily corrected by rendering possible the displacement of the diagram paper D in the longitudinal direction of the drum T by means of a mechanical device such as I and K of Fig. 1.

Figure 2:
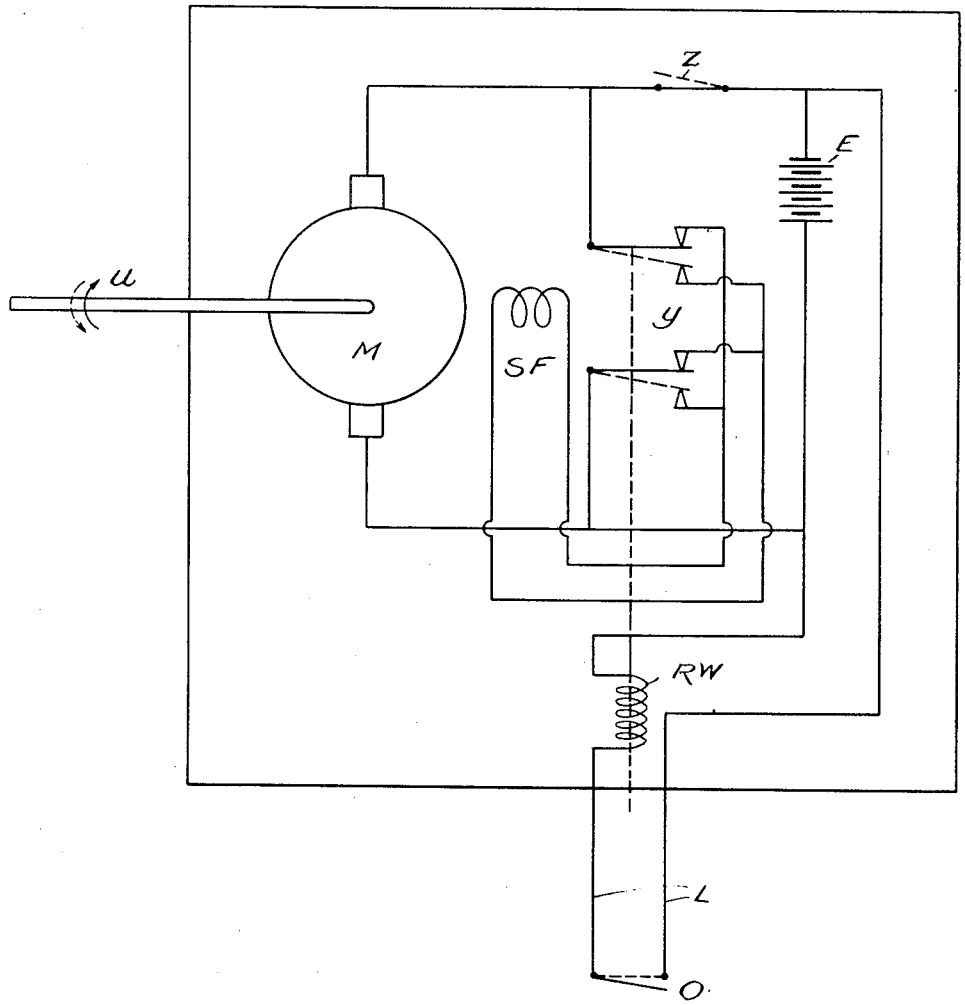
Fig. 2 is a wiring diagram of the control mechanism associated with the motor MI and the switch O.

Fig. 2 illustrates the mechanism indicated as M1 in Fig. 1. Here the motor M is driven by battery E, which is connected through switch Z directly to the armature thereof. The field SF is arranged to be connected selectively in one direction or the other to the battery E by means of the reverse switch Y actuated by an armature passing through relay winding RW which is in series with battery E and switch O, actuated by the person taking the test. Thus when the switch O is open the motor M runs in one direction and when it is closed runs in the reverse direction.

One of the principal advantages of this method is found in the fact that one and the same generator may be connected simultaneously to a number of potentiometers with corresponding recording devices, so that in each instance audiograms for some ten persons may be recorded at the same time by a single investigator.

An audiogram recorded by means of the device is shown in Fig. 3 and consists of a very large number of measured points so that in consequence various conclusions can be reached concerning the subject's hearing. In the audiograms prepared hitherto only some ten measured points could be recorded, whereas according to the present invention more than 100 points can be recorded without difficulty.

As the variations in the audiogram curve indicate the slightest perceptible change in sound intensity, the curve renders it possible to draw conclusions concerning defects in the subject's auditory nerves.

The invention is not limited to the forms of construction described but may be modified in a number of ways without departing from the scope of the invention.

I claim:

1. Apparatus for recording graphically the relation between the frequency, variable with time, of a physical quantity and the intensity of said quantity for points of time determined by an object subjected to the effect thereof, through the actuation of an operator; including in combination, a variable frequency generator for said physical quantity, an intensity reducing device having a regulating means for the physical quantity, means to transmit the output of said reducing device to said object, a reversible servo-system connected to operate said regulating means to effect continuous change thereof selectively as to direction, an object operated control device for the servo-system to effect continuous direction-selective change of said regulating means for the adjustment of the reducing device, a motor, means associating said motor with said generator to vary the frequency thereof in a given manner with time, a supporting member associated with said motor for displacement which is a function of the frequency of said generator, a chart positioned on said supporting member, a linearly movable recording device actuated by said regulating means and arranged to record the position of said regulating means on said chart at right angles to the displacement of said supporting member caused by said motor.

2. The apparatus according to claim 1 in which the chart is so graduated with a frequency scale and an intensity scale that the first will be recorded in the direction of movement of the supporting member and the second in the direction of movement of said recording device.

3. Apparatus according to claim 1 in which a filter is arranged between the intensity reducing device and the output transmitting device, and in which the chart supporting member is movable laterally of its motor driven direction to cooperate with said filter to alter the response curve on said chart in a predetermined manner, said lateral movement resulting from an appropriately shaped track secured to the chart supporting member and operating in engagement with a fixed guide.

4. An arrangement for recording graphically the relation between the frequency of a sound, variable with time and the intensity of said sound at intervals determined by a person hearing the sound, including in combination, a variable acoustical frequency generator of electrical impulses, a potentiometer connected to the output of the generator and having an adjuster to regulate its output, an acoustical transducer receiving the output of said potentiometer and delivering it as sound to the person, a reversible servo-system connected to operate the adjuster, to effect continuous movement thereof selectively as to direction, a control device for operation by the person to cause the servo-system to effect continuous selective displacement of the said regulating member in one direction or the other for the adjustment of the reducing device to produce sounds of threshold value, a motor, means associating said motor with said generator to vary the frequency thereof in a given manner with time, a drum rotated by said motor and thereby correlated to the frequency of said generator, a chart on said drum, a linearly movable recording device actuated by said adjuster and arranged to record the position of the said adjuster on the said chart in a direction parallel to the drum axis.

5. Apparatus according to claim 4 in which a corrective factor is introduced by moving the drum axially to compensate for frequency-intensity deviations comprising a shaped edge on said drum and a fixed guide cooperating therewith.

GEORG von BÉKÉSY.

REFERENCES CITED

The following references are of record in the file of this patent:

UNITED STATES PATENTS

| Number | Name | Date |
| --- | --- | --- |
| 1,661,751 | Fletcher | Mar. 6, 1928 |
| 2,003,913 | Wente | June 4, 1935 |
| 2,156,945 | Huth et al. | May 2, 1939 |
| 2,234,573 | Neumann | Mar. 11, 1941 |
| 2,257,262 | Koren | Sept. 30, 1941 |
| 2,257,263 | Koren | Sept. 30, 1941 |
| 2,310,588 | Mages | Feb. 9, 1943 |